United States Patent
Taschke et al.

(10) Patent No.: US 9,141,103 B2
(45) Date of Patent: Sep. 22, 2015

(54) METHOD AND CONTROLLER FOR CONTROLLING A SAFETY-ORIENTED INDUSTRIAL AUTOMATION COMPONENT

(75) Inventors: Ulrich Taschke, Nürnberg (DE); Karl-Hermann Witte, Nürnberg (DE)

(73) Assignee: Siemens AG, Munich (DE)

(*) Notice: Subject to any disclaimer, the term of this patent is extended or adjusted under 35 U.S.C. 154(b) by 592 days.

(21) Appl. No.: 12/771,483

(22) Filed: Apr. 30, 2010

(65) Prior Publication Data
US 2010/0280633 A1 Nov. 4, 2010

(30) Foreign Application Priority Data
Apr. 30, 2009 (EP) .................................. 09006007

(51) Int. Cl.
*G05B 19/042* (2006.01)

(52) U.S. Cl.
CPC .. *G05B 19/0428* (2013.01); *G05B 2219/23258* (2013.01); *G05B 2219/24188* (2013.01); *G05B 2219/24191* (2013.01)

(58) Field of Classification Search
USPC .......................................................... 700/81
See application file for complete search history.

(56) References Cited

U.S. PATENT DOCUMENTS

| | | | | |
|---|---|---|---|---|
| 4,303,973 A * | 12/1981 | Williamson et al. | ............ | 700/84 |
| 5,768,586 A * | 6/1998 | Zweben et al. | ................ | 713/100 |
| 5,785,283 A * | 7/1998 | Ehrenberger et al. | ........... | 246/62 |
| 5,874,961 A * | 2/1999 | Bates et al. | .................... | 715/786 |
| 6,243,629 B1 | 6/2001 | Sugimoto et al. | | |
| 2007/0185945 A1* | 8/2007 | Barthel | ......................... | 708/200 |

FOREIGN PATENT DOCUMENTS

| | | |
|---|---|---|
| DE | 44 41 070 | 5/1996 |
| EP | 1 128 241 | 8/2001 |
| EP | 1 306 735 | 5/2003 |
| EP | 2 012 201 | 1/2009 |

* cited by examiner

*Primary Examiner* — Carlos Ortiz Rodriguez
(74) *Attorney, Agent, or Firm* — Cozen O'Connor

(57) ABSTRACT

A method for a safety-oriented industrial automation component, wherein the controller is connected to the automation component by a data link includes providing, by a user, an input to the controller at a first user interface. The controller transmits a result of the input to the automation component. The result of the input is used in the automation component to calculate a first test value. The input is converted into a status display in the controller and is output at a second user interface. Here, the user or another user acknowledges the status display by inputting a confirmation, after which a second test value is formed from the status display and the confirmation in the controller, and the second test value is transmitted to the automation component. Finally, the first and second test values are compared in the automation component and the result of the input is used if the comparison is positive.

5 Claims, 2 Drawing Sheets

METHOD AND CONTROLLER FOR CONTROLLING A SAFETY-ORIENTED INDUSTRIAL AUTOMATION COMPONENT

BACKGROUND OF THE INVENTION

1. Field of the Invention

The invention relates to industrial safety devices and, more particularly, to a method for controlling a safety-oriented industrial automation component, and to a controller for a safety-oriented industrial automation component.

2. Description of the Related Art

In industrial automation components, such as "CPUs" or "controllers", a distinction is made between conventional automation components and so-called failsafe automation components or "F-CPUs". Failsafe automation components are used wherever the health or life of people (or animals) may be adversely affected, or where there is the threat of a large amount of environmental or material damage in the event of failure or in the event of a malfunction. Such failsafe systems and controllers are regularly based on a hardware architecture in which the most important components are of redundant (i.e., duplicative) design. Furthermore, in the case of such components, it must also be ensured that the software meets the imposed safety requirements.

In failsafe industrial automation components, a multiplicity of parameters are regularly held with associated values ("data") which must be changed by other automation components, i.e., controllers, during ongoing operation. These controllers, which are often themselves not failsafe components, communicate with the failsafe automation components for this purpose. Here, faults may occur, both in the "non-failsafe" controller and on the communication link, between the controller and the failsafe automation component, which faults influence the data to be transmitted, i.e., the information that changes the values of the parameters in the industrial automation component, such that erroneous values occur for the parameters of the failsafe automation component.

Particular effort when controlling failsafe automation components, i.e., the inputting and changing of values, parameters and instructions, involves having to provide a control station ("F-controller") constructed according to the same safety standards and also having to provide likewise safe data transmission between such a control station and the failsafe automation component.

SUMMARY OF THE INVENTION

It is therefore an object of the present invention to provide a controller and a method for an industrial automation arrangement, which uses standard devices to safely transmit the values to be changed for the parameters of the industrial automation component.

This and other objects and advantages are achieved in accordance with the invention by providing, in addition to the user interface ("faceplate") which makes it possible to input new values, parameters or other control operations for the automation component, a second unit which is independent thereof in a controller associated with the failsafe industrial automation component. The second unit provides a second user interface which allows a user to confirm the inputs or changes which have previously been made. Here, provision is made for the inputs or changes (e.g., control operations) confirmed in this manner to be converted into a test value which is transmitted to the failsafe automation component, and which is compared at the fail safe automation component with a further test value which was calculated by the automation component from the previously received inputs or changes (i.e., control operations). In accordance with the invention, the inputs are intended to become effective in the automation component only when the two test values match.

The object of the invention is also achieved, by a method for controlling a safety-oriented industrial automation component by a controller connected to the automation component by a data link, wherein, in a first step, a user provides an input to the controller at a first user interface, and the controller transmits a result of the input to the automation component. In a second step, the result of the input is used in the automation component to calculate a first test value and, in a third step, the input is converted into a status display in the controller and is output at a second user interface. In a fourth step, the user (or a further user) acknowledges the status display by inputting a confirmation, after which, in a fifth step, a second test value is formed from the status display and the confirmation in the controller and is transmitted to the automation component. In a sixth step, the first and second test values are finally compared in the automation component, and the result of the input is used in the automation component if the comparison is positive.

The practice of protecting access to the automation component based on the displays and inputs as part of a confirmation (acknowledgement) makes it possible to flexibly plan control functions in a controller with standard devices. As a result, a safety-oriented component advantageously need not be used for the controller itself, but rather means and methods which correspond to the standard device can be used for the controller and for data transmission between the controller and the safety-oriented industrial automation component. It is possible to dispense with the effort needed to create and program a safety-oriented (i.e., redundant, failsafe and certified) control station and likewise safety-oriented data transmission. A particular advantage is that it is thus ensured that precisely that information which was also displayed by and confirmed with the second dialog (i.e., the third and fourth steps) is used. The "what you see is what you get" (WYSIWYG) principle applies.

In accordance with the invention, a controller for a safety-oriented industrial automation component is also provided, where to perform one of the abovementioned methods, the controller comprises a first user interface for performing the first step, and a conversion unit and a second user interface for performing the third and fourth steps. A computation unit for performing the fifth step is also provided. Such a controller can be constructed with standardized device without having to pursue the increased effort for a safety-oriented technical concept. Such a controller can be used to safely input, confirm and transmit instructions, values or changes in values for a safety-oriented industrial automation component.

A plurality of inputs are advantageously made at the first user interface in a control step, a plurality of second test values being formed from this plurality of inputs in the controller and a plurality of first test values being formed from the results of the inputs in the automation component, where the plurality of first test values are combined to form a first total test value and the plurality of second test values are combined to form a second total test value. In the sixth step, the first total test value and the second total test value are compared with one another as the first and second test values. Alternatively, it is possible to directly convert all inputs into a total test value. As a result, it is also possible to protect different control steps or a plurality of values/changes in values using a single test step. On the one hand, the "workflow" is thus simplified for a user in that only a "collective" confirmation step is also necessary. On the other hand, computation complexity can be saved both by the controller and by the automation component.

Particularly safe programming occurs if the first and second test values are each calculated using different calculation rules (i.e., programs) which, however, for the same test contents, arrive at the same test value, i.e., they have the same effect in this respect.

In an embodiment, inputs that are directly transmitted by the first user interface to the second user interface inside the controller are used to output the status display in the third step. In an alternative embodiment, the inputs that were received by the automation component in the first step and were then transmitted back to the controller are used to output the status display. Whereas these inputs and data can be transmitted in a faster and simpler manner in the former case, the procedure described second can increase safety further because errors during the data transmission in the first step can also be discovered in this case with a greater degree of probability.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the method according to the invention are explained below using the drawing. They are simultaneously used to explain an exemplary embodiment of a controller according to the invention, in which.

DETAILED DESCRIPTION OF THE PRESENTLY PREFERRED EMBODIMENTS

Figure 1:
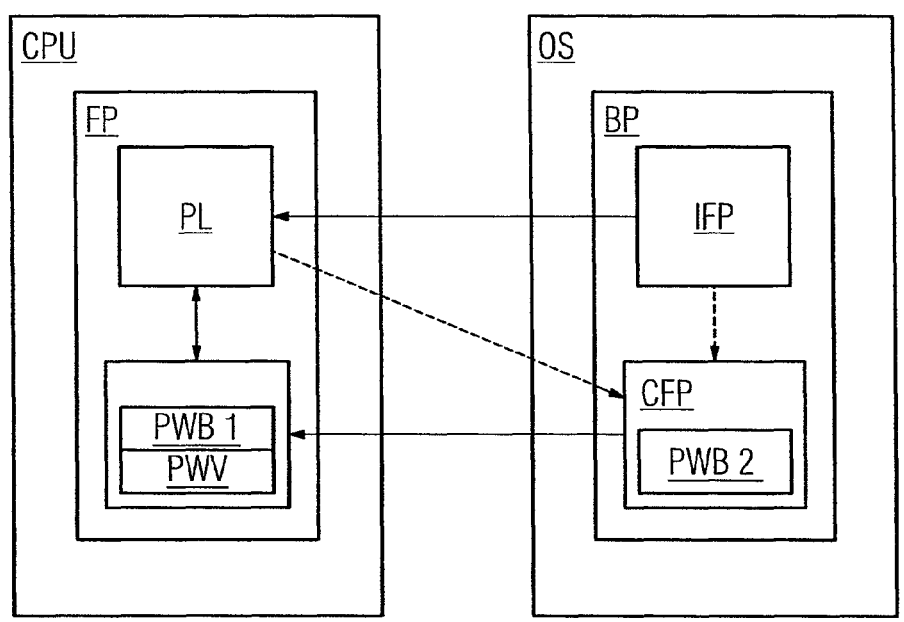
FIG. 1 is a schematic block diagram of a failsafe industrial automation component and an associated controller in accordance with the invention.

FIG. 1 illustrates safety-oriented ("failsafe") industrial automation component (CPU) connected to the controller Operation Station (OS) through an information network (not shown). The automation component (CPU) is provided with safety-oriented software Failsafe Program (FP) comprising a parameter list (PL). The parameter list (PL) comprises variables, constants or information relating to settings i.e., all information which is intended to be input, retrieved and changed by the controller (OS). In addition to the parameter list (PL), the safety-oriented software (FP) comprises a further function block with the modules (PWB1) test value calculation 1 and test value comparison (PWV). In the present exemplary embodiment, the controller (OS) is not or is not necessarily in the form of a safety-oriented component, i.e., in contrast to the automation component (CPU), no special measures with regard to failure safety, certification or redundancy have been taken or have to be taken. In addition to other devices which are not relevant here and therefore have not been illustrated here, the controller (OS) comprises the control program (BP) which provides the user interfaces which are needed to control the automation component (CPU), which ensures communication with the automation component (CPU), and ensures that the controller (OS) safely detects and transmits inputs and the resultant values, and changes in values or other control operations for the software (FP). For this purpose, inputs, such as keyboard inputs, "mouse clicks" or other so-called "GUI events", are converted into results, e.g., usually binary coded information for changing the value of one or more parameters of the automation component (CPU).

For this purpose, the control program (BP) comprises a first function block Initiator Faceplate (IFP) having a first user interface and a second function block Confirmer Faceplate (CFP) which is intended to implement a second user interface and has the module PWB2 ("test value calculation 2") for calculating a test value in the controller.

In order to calculate the respective test values, the modules (PWB1) and (PWB2) use algorithms that are compatible with one another, or in certain embodiments identical, i.e., both modules calculate the same test value based on the same input or resultant values or changes in values. Here, standardized components can be used to construct the control program (BP).

As a result of the modular structure of the software (FP), it is often possible to resort to existing components if data types and parameters are changed. As a result, certification of the safety-oriented automation component (CPU) and the software (FP) is simplified.

In accordance with the method of the invention, a value for a parameter in the parameter list (PL) is input to the controller and its correct input and transmission are ensured. Here, a user inputs the new value for the parameter at a first user interface of the program component (IFP) by operating a conventional graphical user interface (GUI) element. A binary-coded value or change in value (i.e., a "delta") or an instruction is now transmitted to the automation component (CPU) by the controller, i.e., by a communication routine of the component (IFP), as the result of the input by the user and is buffered by a program routine in the automation component. The result is now transmitted back to the controller (OS) from the automation component (CPU) by a further data transmission operation and is displayed in the controller (OS) by the second user interface of the module (CFP). In an alternative embodiment, however, the result of the input can also be directly transmitted from the function block (IFP) to the function block (CFP). Both alternative embodiments are illustrated in FIG. 1 using dashed arrows.

The user now uses the second user interface and GUI elements arranged there to confirm that he/she would like to actually activate or "enable" the result of the original display input, i.e., the new value for the parameter to be processed in accordance with the present example, in the automation component (CPU). This confirmation may also be optionally authorized by inputting a PIN or an electronic signature. A test value is now calculated from the displayed and confirmed and, if appropriate, also from the input pin or electronic signature using the module (PWB2), and is transmitted to the component (PWV) of the automation component (CPU) and stored in the component (PWV). In a similar manner to this calculation of the test value, a test value (i.e., a first test value) is likewise calculated from the buffered value, which was transmitted to the automation component (CPU) in the first step, by the module (PWB1) and is compared with the test value (i.e., a second test value) calculated by the controller (OS). If the comparison is positive, the buffered value is accepted into the parameter list (PL) and can be subsequently used in the automation component (CPU).

The method described above need not necessarily be performed separately for each changed value or for each individual input/control operation; it is also possible to use a single method run to process a plurality of inputs, values, parameters or commands, even of different types.

Figure 2:
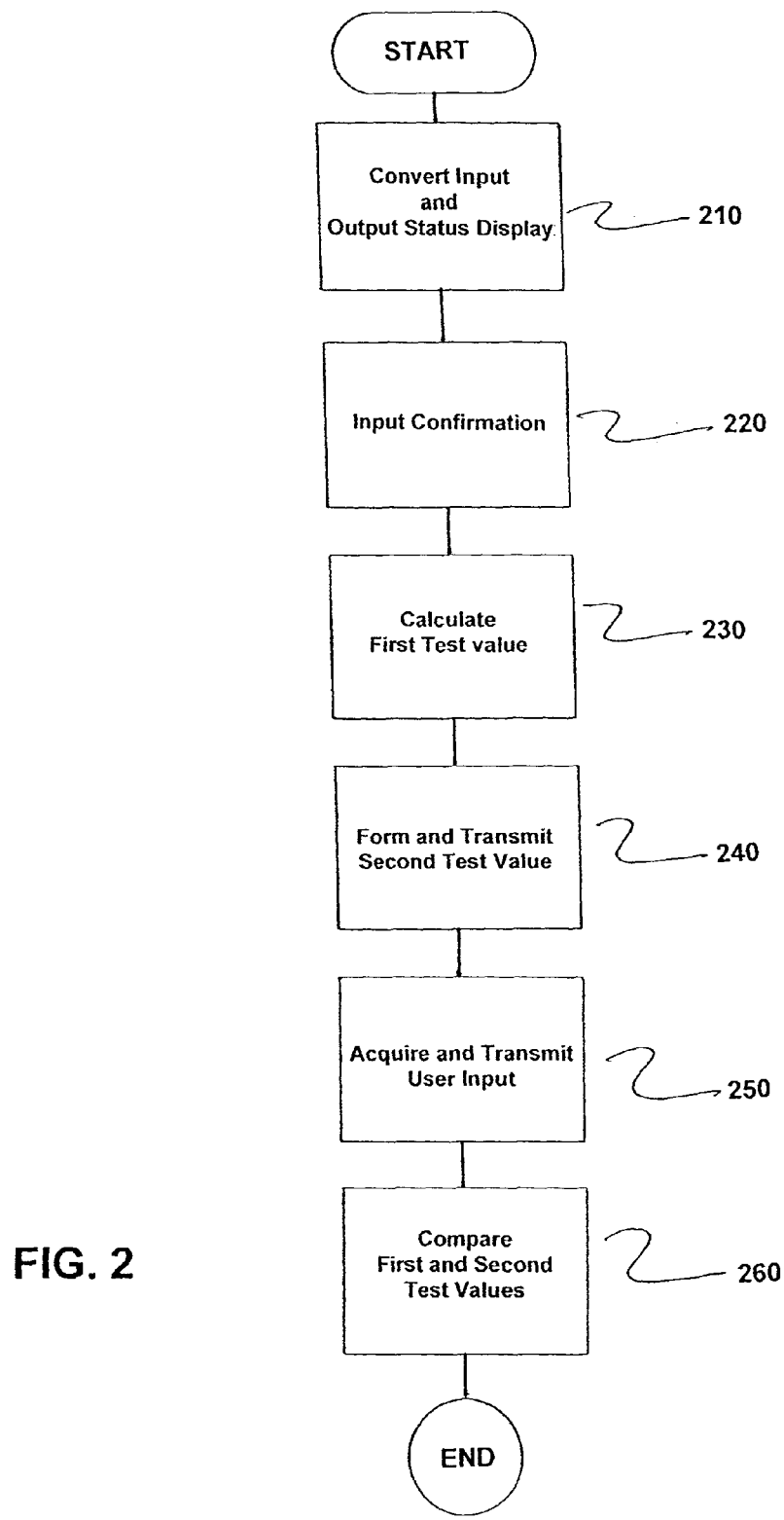
FIG. 2 is a flow chart illustrating the method in accordance with an embodiment of the invention.

FIG. 2 is a flow chart illustrating the method for controlling a safety-oriented industrial automation component with a controller which is connected to the automation component by a data link in accordance with an embodiment of the invention. The method comprises acquiring a user input to the controller at a first user interface, and transmitting from the controller a result of the input to the automation component, as indicated in step 210. Next, a first test value is calculated in the automation component based on the result of the input, as indicated in step 220.

The input is converted in the controller into a status display and outputting the status display at a second user interface, as indicated in step 230. Next, the user inputs a confirmation to acknowledge the status display, as indicated in step 240. A second test value is formed from the status display and the confirmation in the controller, and the transmitting the second test value is transmitted to the automation component, as indicated in step 250. The first and second test values are then compared at the automation component, and the result of the comparison is used as the input if the comparison is positive, as indicated in step 260.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for controlling a safety-oriented industrial automation component arranged in an industrial automation arrangement with a controller which is connected by a data link to the safety-oriented industrial automation component arranged in the industrial automation arrangement, the method comprising:
    acquiring a user input by the controller at a first user interface, and transmitting from the controller a result of the input to the safety-oriented industrial automation component arranged in the industrial automation arrangement, the safety-oriented industrial component comprising a parameter list associated with a failsafe program;
    calculating, in the safety-oriented industrial automation component arranged in the industrial automation arrangement, a first test value based on the result of the input;
    converting, in the controller, the input into a status display and outputting the status display at a second user interface, said converting comprising transmitting the result of the input, which is transmitted to the safety-oriented industrial automation component arranged in the industrial automation arrangement, back to the controller from the safety-oriented industrial automation component, and converting the result of the input into the status display;
    inputting, at the second interface, a confirmation comprising a graphical user event to acknowledge acceptance of the status display;
    forming, in the controller, a second test value from the status display and the confirmation indicating acceptance of the status display;
    transmitting from the controller the second test value to the safety-oriented industrial component; and
    comparing, at the safety-oriented industrial automation component arranged in the industrial automation arrangement, the first and second test values, and when the comparison is positive, accepting the result into the parameter list and subsequently using the result.

2. The method as claimed in patent claim 1, wherein the step of acquiring comprises acquiring a plurality of inputs at the first user interface;
    wherein a plurality of second test values are formed from the plurality of inputs in the controller and a plurality of first test values are formed in the safety-oriented industrial automation component arranged in the industrial automation arrangement from results of the plurality of inputs; and
    wherein the plurality of first test values are combined to form a first total test value and the plurality of second test values being combined to form a second total test value, and wherein said step of comparing the first and second test values further comprises comparing the first total test value and the second total test value with one another as the first and second test values.

3. The method as claimed in claim 1, wherein the first and second test values are each calculated using different calculation rules which have a same effect.

4. The method as claimed in claim 1, wherein said step of converting the input into a status message comprises transmitting the input inside the controller from the first user interface to the second user interface.

5. A controller for a safety-oriented industrial automation component arranged in an industrial automation arrangement, comprising:
    a first function block having a first user interface configured to acquire a user input including a confirmation comprising a graphical user event to acknowledge acceptance of a status display and to transmit a result of the input to the safety oriented industrial automation component arranged in the industrial automation arrangement, the safety-oriented industrial component comprising a parameter list associated with a failsafe program;
    a second function block having a second user interface configured to calculate a first test value based on the result of the input, convert the input into a status display and output the status display at the second user interface, said conversion comprising transmitting the result of the input, which is transmitted to the safety-oriented industrial automation component arranged in the industrial automation arrangement, back to the controller from the safety-oriented industrial automation component, and converting the result of the input into the status display;
    wherein the second function block includes a module configured to form a second test value from the status display and the confirmation of the status display received from a user at the second user interface indicating the acceptance of the status display, the module further configured to transmit the second test value to the safety-oriented industrial automation component arranged in the industrial automation arrangement; and wherein the first and second test values are compared at the safety-oriented industrial automation component arranged in the industrial automation arrangement, and when the comparison is positive, the result is accepted into the parameter list and subsequently used.

* * * * *